(12) United States Patent
Kivisto

(10) Patent No.: US 11,338,674 B2
(45) Date of Patent: May 24, 2022

(54) ERGONOMIC CONTROL MECHANISM FOR SELF-PROPELLED FLOORING EQUIPMENT

(71) Applicant: National Flooring Equipment, Inc., Minneapolis, MN (US)

(72) Inventor: John A. Kivisto, Oak Grove, MN (US)

(73) Assignee: National Flooring Equipment, Inc., Minneapolis, MN (US)

( * ) Notice: Subject to any disclaimer, the term of this patent is extended or adjusted under 35 U.S.C. 154(b) by 321 days.

(21) Appl. No.: 16/459,897

(22) Filed: Jul. 2, 2019

(65) Prior Publication Data

US 2021/0001720 A1  Jan. 7, 2021

(51) Int. Cl.
| | |
|---|---|
| *B60K 26/02* | (2006.01) |
| *G05G 9/04* | (2006.01) |
| *B24C 9/00* | (2006.01) |
| *B24C 3/06* | (2006.01) |
| *G05G 9/047* | (2006.01) |

(52) U.S. Cl.
CPC .............. *B60K 26/02* (2013.01); *B24C 3/067* (2013.01); *B24C 9/00* (2013.01); *G05G 9/047* (2013.01); *B60K 2026/024* (2013.01); *B60K 2026/025* (2013.01); *B60K 2026/029* (2013.01); *B60Y 2200/225* (2013.01); *G05G 2009/04774* (2013.01)

(58) Field of Classification Search
CPC .. B60K 26/02; B60K 26/04; B60K 2026/024; B60K 2026/025; B60K 2026/029; B24C 3/06; B24C 3/067; B24C 9/00; G05G 9/047; G05G 2009/04703; G05G 2009/04707; G05G 2009/04744; B24B 7/18; B60Y 2200/225; A63F 13/245

See application file for complete search history.

(56) References Cited

U.S. PATENT DOCUMENTS

| | | | | | |
|---|---|---|---|---|---|
| 2,228,393 | A | * | 1/1941 | Leaming | F02D 11/10 200/61.57 |
| 6,161,449 | A | * | 12/2000 | Fujimori | B62D 1/043 74/557 |
| 7,204,338 | B2 | * | 4/2007 | Katae | B62D 1/043 180/315 |
| 7,562,412 | B1 | * | 7/2009 | Anderson | E04G 23/006 15/93.1 |
| 7,621,365 | B2 | * | 11/2009 | Egan | B62D 1/046 280/771 |
| 9,931,013 | B2 | * | 4/2018 | Nonnenmann | A47L 11/4041 |

(Continued)

FOREIGN PATENT DOCUMENTS

| | | |
|---|---|---|
| CN | 209033707 | 6/2019 |
| JP | 04356272 A * | 12/1992 |

(Continued)

OTHER PUBLICATIONS

Logitech Driving Force Racing Wheel; https://web.archive.org/web/20181004071030/https://www.logitechg.com/en-us/products/driving/driving-force-racing-wheel.html; Published Oct. 4, 2018 (Year: 2018).*

*Primary Examiner* — Adam D Rogers

(74) *Attorney, Agent, or Firm* — Bradley J. Thorson; DeWitt LLP

(57) ABSTRACT

Control of a self-powered floor preparation machine is provided by an ergonomic controller having a guarded control stick which has various characteristics, including its pitch, roll, yaw and height, that may all be adjusted.

18 Claims, 4 Drawing Sheets

(56) References Cited

U.S. PATENT DOCUMENTS

| | | |
|---|---|---|
| 10,729,300 B2 * | 8/2020 | Berg .................. A47L 11/4066 |
| 2014/0230183 A1 | 8/2014 | Nonnenmann et al. |
| 2020/0121150 A1 * | 4/2020 | O'Kane ................ A47L 11/24 |
| 2020/0317279 A1 * | 10/2020 | Mastronardi ........... B66F 11/04 |
| 2021/0001448 A1 * | 1/2021 | Kivisto .................... B24C 3/14 |
| 2021/0001449 A1 * | 1/2021 | Kivisto .................. A47L 11/02 |
| 2021/0001451 A1 * | 1/2021 | Kivisto .............. A47L 11/4005 |

FOREIGN PATENT DOCUMENTS

| | | | |
|---|---|---|---|
| JP | 09029641 | 2/1997 | |
| JP | 2018123674 | 8/2018 | |
| KR | 1020180052047 | 5/2018 | |
| WO | WO-9914095 A1 * | 3/1999 | ............. B62D 1/043 |

* cited by examiner

US 11,338,674 B2

ERGONOMIC CONTROL MECHANISM FOR SELF-PROPELLED FLOORING EQUIPMENT

CROSS-REFERENCED TO RELATED APPLICATIONS

Not applicable

STATEMENT REGARDING FEDERALLY SPONSORED RESEARCH OR DEVELOPMENT

Not applicable

BACKGROUND OF THE INVENTION

I. Field of the Invention

The present invention relates to equipment used to prepare a floor for refinishing. More specifically, the present invention relates to such equipment that is self-propelled and steerable.

II. Discussion of the Prior Art

Various types of devices are employed to prepare a floor for refinishing. This includes machines designed to scrape tile and carpet from a floor, polishers, grinders, burnishers and shot blasters. National Flooring Equipment, Inc. of Minneapolis, Minn., has been a leading manufacturer and distributor of floor preparation equipment for sixty years.

Many concrete floors in commercial building and residential garages are finished with epoxy coatings. Over time resurfacing is required. The original surface must be roughened up to permit the new layer of epoxy to properly adhere to the floor. This step of roughening the floor may be performed using a grinder or a shot blaster.

A shot blaster is designed to blast small metal pellets (shot) onto the floor's surface. Shot blasters typically include a reservoir containing a supply of shot, a mechanism for metering the delivery of the shot, an impeller that provides the force to blast the metered shot at the floor, and a powerful vacuum that collects the used shot, as well as the dust and debris generated by the shot blasting processes. National Flooring Equipment offers a series of shot blasters of different sizes and configurations. These include the National HB5 handheld shot blaster, the National A30 self-propelled shot blaster, and the National A12 ride-on shot blaster.

While all shot blasters offered by National are of high quality and effectively treat the floor, National is continually trying to improve its equipment offerings.

SUMMARY OF THE INVENTION

The present invention provides various ergonomic improvements to the steering mechanisms for self-propelled shot blasters and other types of self-propelled floor preparation equipment. These improvements are directed to an ergonomic controller for controlling and steering the machine.

More specifically, the ergonomic controller comprises a mount, a joint and a control stick. The ergonomic controller may also include a height-adjustable column.

The mount is essentially a plate including a first handle and a channel, and a hub positioned and mounted within the channel. The hub is adapted to rotate about a first axis of rotation substantially perpendicular to the plate. The first handle may be an opening through the plate. An additional opening through the plate may be present to provide a second handle.

The joint may take several forms such as a hinge, a double hinge, or a ball joint. A single hinge allows rotation along a single axis of rotation. A double hinge allows rotation along two independent axes of rotation that are typically perpendicular to each other. A ball joint allows even greater flexibility of adjustment. In most cases, the joint has a first member coupled to a machine and a second member coupled to the mount. The joint also has at least one pivot member, e.g., a pin of a hinge or a ball of a ball joint. The pivot member allows the second member of the joint to be pivoted relative to the first member. The joint also includes a first lock. The lock is adapted to be loosened to permit the second member and attached mount to be pivoted relative to the first member and the machine. The lock is also adapted to be tightened to selectively fix the second member and mount in place at a selected orientation relative to the first member and machine.

The control stick, itself, is mounted to and extends from the hub. As such, the hub permits the control stick to rotate along the first axis of rotation either separately or along with the hub.

As noted above, the ergonomic controller may further comprise a height adjustable column. The height adjustable column is disposed between the first member of the joint and the rest of the machine. The height adjustable column has at least two sections that are adapted to telescope with respect to each other such that the length of the column is adjustable. A second lock is provided to selectively fix the length of the height adjustable column.

As should be clear from the foregoing, the height of the control stick is adjusted via the height adjustable column. At least the pitch of the control stick is adjustable using the joint. Depending on the joint used, the roll of the control stick may also be adjustable. The yaw of the control stick is adjustable by rotating the control stick about the first axis of rotation.

Those skilled in the art will understand that self-propelled shot blasting machines often have a steerable drive wheel driven by a first electric motor, a second electric motor driving a blast wheel, a hopper containing a supply of shot, a valve for metering shot from the hopper to the blast wheel, and a plenum coupled to a vacuum. The control stick of the ergonomic controller described above allows for one-handed control of at least the first electric motor and, thus, the speed and direction of travel of the machine. The control stick will typically include switches that may be manipulated to control speed and direction (forward or reverse) of the machine. Either the handles or the control stick may be grasped and used to steer the machine in a controlled manner.

BRIEF DESCRIPTION OF THE DRAWINGS

The foregoing features, objects and advantages of the invention will become apparent to those skilled in the art from the following detailed description of the preferred embodiment, especially when considered in conjunction with the accompanying drawings in which like numerals in the several views refer to corresponding parts.

DESCRIPTION OF THE PREFERRED EMBODIMENT

Figure 1:
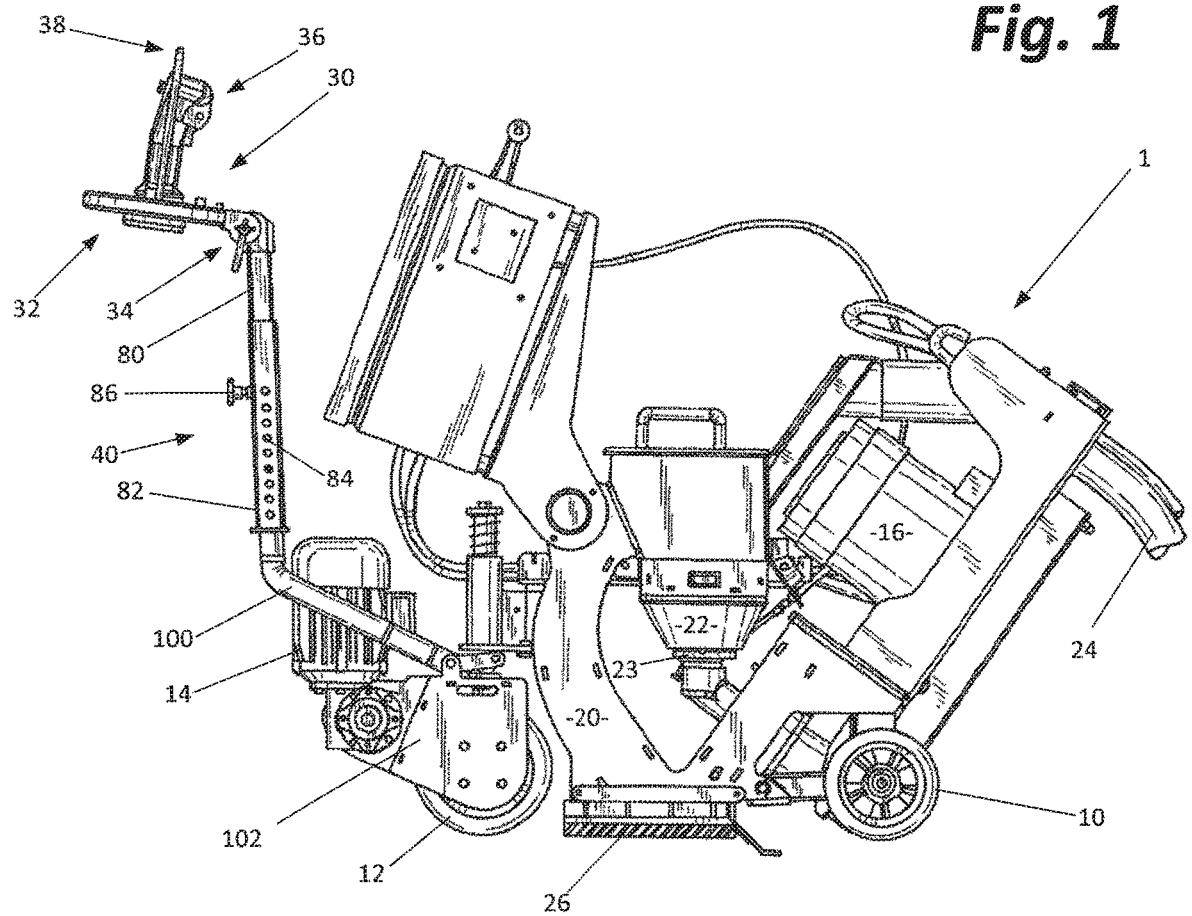
FIG. 1 is a side view of a self-propelled shot blasting machine.

This description of the preferred embodiments is intended to be read in connection with the accompanying drawings, which are to be considered part of the entire written description of this invention. In the description, relative terms such as "lower", "upper", "horizontal", "vertical", "above", "below", "up", "down", "top" and "bottom" as well as derivatives thereof (e.g., "horizontally", "downwardly", "upwardly", etc.) should be construed to refer to the orientation as then described or as shown in the drawings under discussion. These relative terms are for convenience of description and do not require that the apparatus be constructed or operated in a specific orientation. Terms such as "connected", "connecting", "attached", "attaching", "join" and "joining" are used interchangeably and refer to one structure or surface being secured to another structure or surface or integrally fabricated in one piece, unless expressively described otherwise.

Figure 2:
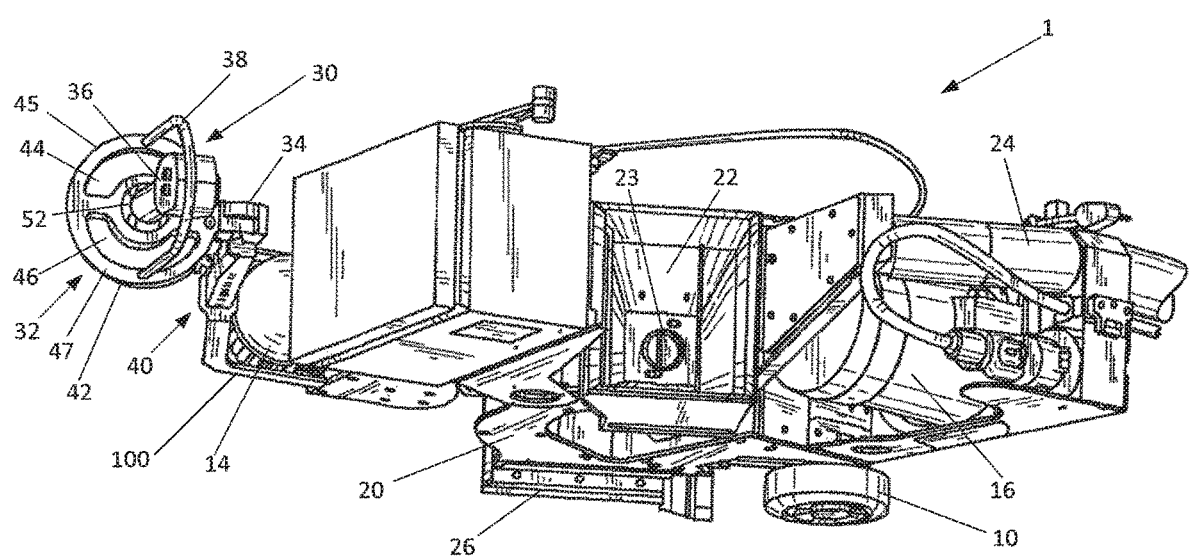
FIG. 2 is a top view of a self-propelled shot blasting machine of FIG. 1.

A self-propelled shot blasting machine 1 is shown in FIGS. 1 and 2. The machine 1 sits on a pair of rear wheels 10 and a front drive wheel 12.

Machine 1 is driven by an electric motor 14 coupled to drive wheel 12. The machine 12 has a second motor 16 that drive a blast wheel (not shown).

The machine 1 also has a plenum 20 incorporating a hopper 22. The plenum 20 is coupled to a vacuum (not shown) by a vacuum tube 24.

Hopper 22 is filled with shot prior to use. The vacuum is then energized to create air flow through the plenum 20. The motors 14 and 16 are then energized. Energizing motor 16 causes the shot wheel to spin. Shot is metered from hopper 22 through a valve 23 to the shot wheel which accelerates the shot toward the floor in an area confined by a suction head 26. As the shot impacts the floor's surface, that surface is roughened. The shot, floor debris and dust are carried through the plenum 20 by the air flow. The dust and debris are carried to a collection bag (not shown) by the vacuum. The shot is deposited back into the hopper 22 and reused.

Operation of at least motor 14 is controlled by ergonomic controller 30. As shown, the ergonomic controller 30 comprises a mount 32, joint 34, control stick 36, a guard rail 38 and a height adjustable column (mounting bar) 40.

Figure 3:
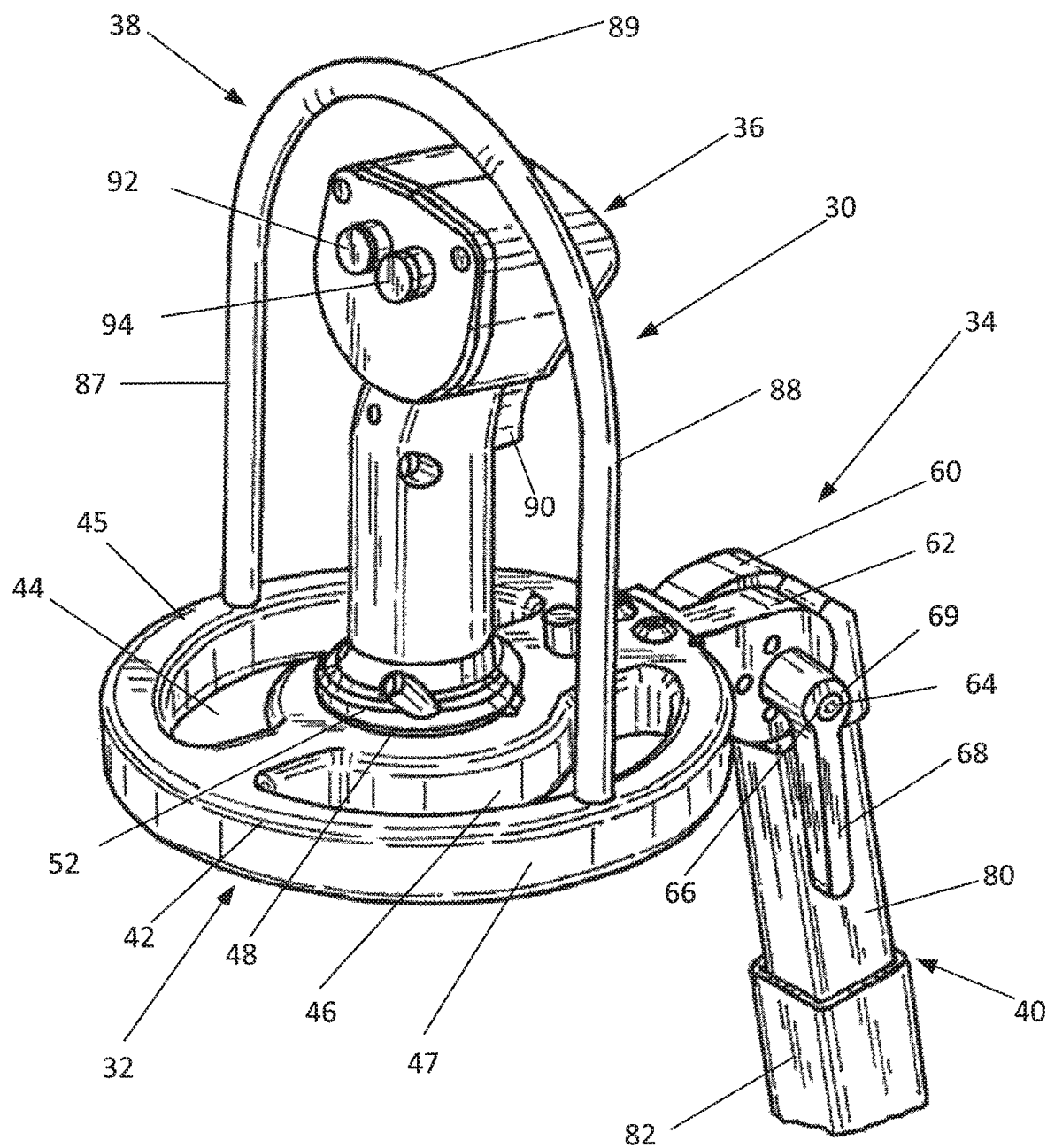
FIG. 3 is perspective view of the ergonomic controller of the shot blasting machine of FIG. 1.
Figure 4:
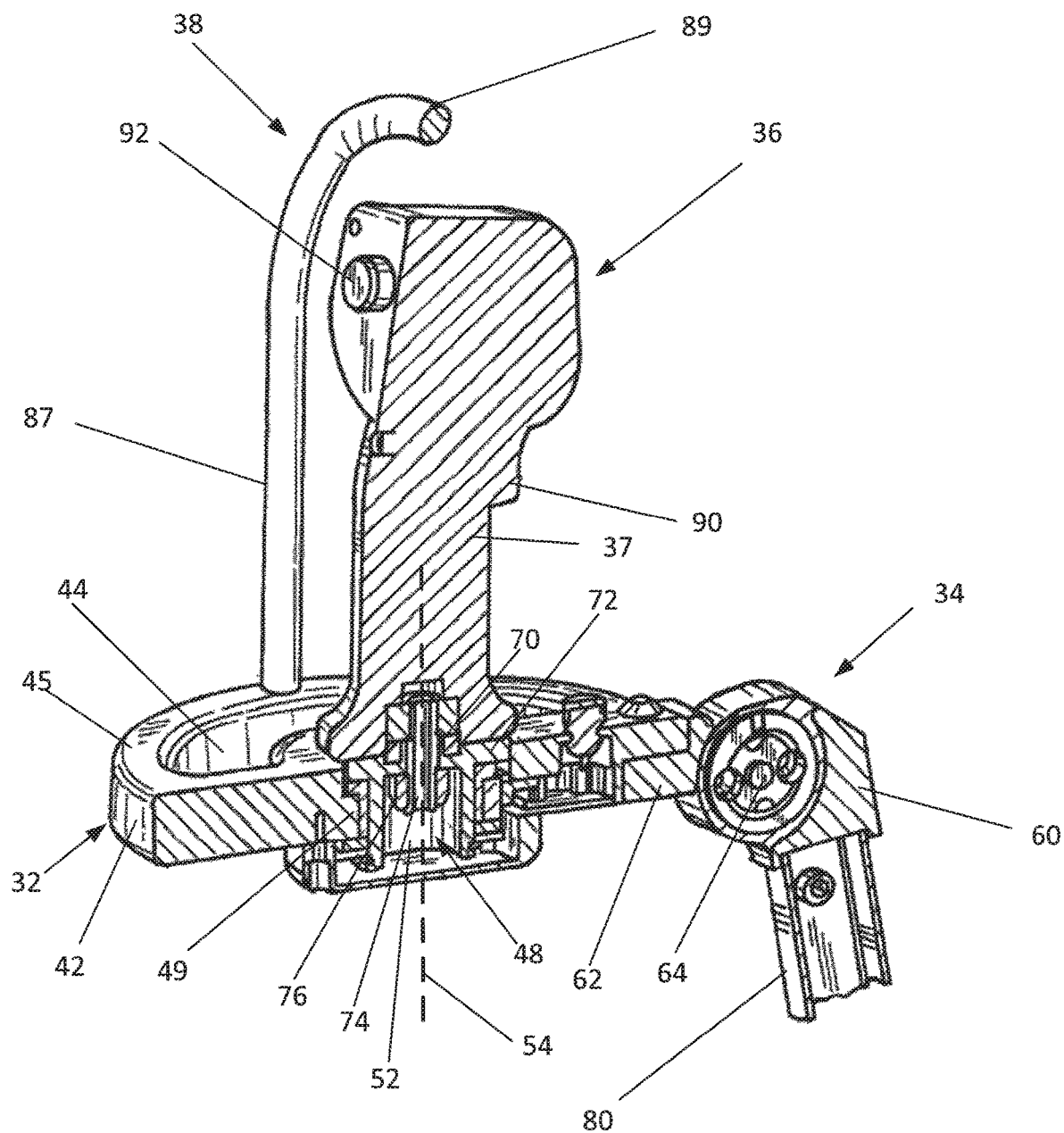
FIG. 4 is a cross-sectional view of the ergonomic controller of FIG. 3.

One such mount 32 is shown in greater detail in FIGS. 2 through 4. The mount 32 comprises a circular plate 42 having a pair of semi-circular openings 44/46. The material between these openings and the perimeter of the plate 42 serve as handles 45/47. The mount 32 also comprises a channel 48 extending through the center of the plate 42. A circular protrusion (collar) 49 extends into the channel 48. Mounted within the channel is a hub 52. The hub 52 is configured to rotate about a first axis of rotation 54 or to at least permit the control stick 36 to rotate about axis 54.

The joint 34 comprises a first member 60 coupled to the machine 1 via the height adjustable column (adjustable mounting bar) 40. The joint 34 further comprises a second member 62 coupled to the mount 32. The joint 34 also includes a pivot member 64. The pivot member 64 shown is a pin coupled to the first member 60 and having a threaded end 66 extending through an opening in the second member 62. The second member 62 is adapted to rotate about the pivot member 64.

The joint 34 also comprises a first lock 68. As shown, the first lock 68 comprises a locking knob that has a threaded opening 69 adapted to be coupled with the threaded end 66 of pivot member 64. When the first lock 68 comprises such a locking knob, the lock 68 is released by turning the locking knob in a first direction thereby loosened the locking knob and permitting the second member 62 and the mount 32 to be pivoted about pivot member 64 relative to the first member 60, the height adjustable column (adjustable mount bar) 40 and the machine 1. When the mount 32 is in a desired preselected position, lock 68 is engaged by turning the locking knob in a second direction to tighten the locking knob. Engaging the lock 68 by tightening the lock knob serves to selectively fix the second member 62 and the mount 32 in place in the selected position relative to the first member 60, the height adjustable column (adjustable mount bar) 40 and the machine 1.

As shown in FIGS. 1 through 4, the control stick 36 is mounted to the hub 52. The control stick 36 is mounted to the hub in a manner that allows the control stick 36 to rotate about the first axis of rotation 52. As best shown in FIG. 4, the hub 52 has an orifice 70 extending through a top plate 72. The orifice 70 is adapted to receive a post 74 with a threaded end projecting downwardly from the main body 37 of control stick 36. A nut 76 is coupled to the threaded end of post 74 to couple the control stick to the hub 52. The hub 52 may be stationary relative to the plate 42 and the connection of the post 74 to the hub 52 could permit rotation of the control stick 36 about the first axis of rotation 54. Alternatively, the assembly of the hub 52, plate 42 and control stick 36 may be adapted so that the hub 52 and control stick 36 rotate together about axis 54.

One skilled in the art should recognize that the rotatable connection between the control stick 36 and the mount 32 permit the yaw of the control stick 36 to be adjusted. Further, the joint 34 shown allows the pitch of the control stick 36 to be adjusted. When the pivot member 64 is a pin, this is achieved by orienting the pin so that the pin extends along a second axis of rotation perpendicular to the first axis of rotation 52. If a ball joint or a double hinge joint is employed as the joint 34, the roll of the control stick 36 is also adjustable.

Height adjustment is provided by the height adjustable column (adjustable mounting bar) 40. As shown in FIG. 1, column/bar 40 comprises a pair of telescoping sections 80 and 82. Section 80 is coupled to the first member 60 of joint 34. Section 82 is coupled to a steerable tow bar 100 which is also coupled to a mounting assembly 102 for the steerable front wheel 12 of the machine 1. Manipulation of the mount 32 via either the control stick 36 or the handles 45 and 47 steers the machine.

Each of the telescoping sections 80/82 has a set of holes 84 along its length. The overall length of the height adjustable column (mounting bar) 40 is adjusted by telescoping the telescoping sections 80 and 82 relative to each other. A second lock 86 may be employed to secure the two sections 80 and 82 to fix the length of the height adjustable column (adjustable mounting bar) 40 as a selected length. This second lock 86 may be as simple as a locking pin extending through aligned holes in the sections 80 and 82.

All the adjustment features referenced above may be employed separately or in any combination together. When all are employed, the yaw, pitch, roll and height of the control stick 36 are all adjustable.

The drawings further show a guard 38 extending from the mount adjacent the control stick 36. Guard 38 includes a first leg 87 and a second leg 88 extend perpendicularly from the top of plate 42. The two legs 87 and 88 are joined together by a curved section 89. When in use, the operator's hand is positioned between the control stick 36 and the guard 38 such that the guard provides some level of protection for the hand if the guard engages some other object during operation of the machine. The guard 38 protects the control stick in the similar fashion.

As shown in FIG. 3, the control stick includes at least three buttons, 90, 92 and 94. Button 90 turns motor 14 on and off to turn the drive wheel 12. When buttons 90 and 94 are depressed simultaneously, the wheel 12 turns twice as fast and, thus, changes the speed at which the machine travels across a floor. Button 92 changes the direction in which the motor 14 spins wheel 12 and, thus, the direction of travel of the machine (forward and reverse).

This invention has been described herein in considerable detail in order to comply with the patent statutes and to provide those skilled in the art with the information needed to apply the novel principles and to construct and use embodiments of the example as required. However, it is to be understood that the invention can be carried out by specifically different devices and that various modifications can be accomplished without departing from the scope of the invention itself.

What is claimed is:

1. A controller for a self-propelled floor preparation machine comprising:
   a. a mount comprising a first handle and a hub defining a first axis of rotation;
   b. a joint having a first member coupled to the self-propelled floor preparation machine, a second member coupled to the mount, a pivot member adapted to permit the second member to pivot relative to the first member, and a first lock, wherein the first lock is adapted to be released to permit the second member and the mount to be pivoted relative to the first member and the self-propelled floor preparation machine, wherein the first lock is further adapted to be engaged to selectively fix the second member and mount in place in a selected position relative to the first member and the self-propelled floor preparation machine, wherein the pivot member of the joint comprises a pin having a threaded end, said pin extending along a second axis of rotation substantially perpendicular to the first axis of rotation and pivotally coupling said first member and second member together, and wherein the first lock of the joint comprises a knob having a threaded bore adapted to receive the threaded end of the pin, wherein the first lock is adapted to be released by loosening the knob to permit the second member and the mount to be pivoted about the second axis of rotation and further adapted to be engaged by tightening the knob to selectively fix the second member and mount in place at a selected angle relative to the self-propelled floor preparation machine; and
   c. a control stick mounted to and extending from the hub and adapted to be rotated about the first axis of rotation.

2. The controller of claim 1 further comprising an adjustable mounting bar coupling the first member of the joint to the self-propelled floor preparation machine, said adjustable mounting bar comprising two sections that telescope with respect to each other to adjust the length of the adjustable mounting bar.

3. The controller of claim 2 wherein the adjustable mounting bar allows the height of the control stick to be adjusted, the joint allows at least the pitch of the control stick to be adjusted, and the hub allows yaw of the control stick to be adjusted.

4. The controller of claim 3 wherein the joint is selected from a group consisting of a ball joint and a double hinge joint.

5. A self-propelled floor preparation machine comprising:
   a. a steerable drive wheel driven by a first electric motor; and
   b. a controller comprising:
      i. a mount comprising a first handle and a hub defining a first axis of rotation;
      ii. a joint having a first member coupled to the self-propelled floor preparation machine, a second member coupled to the mount, a pivot member adapted to permit the second member to pivot relative to the first member, and a first lock, wherein the first lock is adapted to be released to permit the second member and the mount to be pivoted relative to the first member and the self-propelled floor preparation machine, wherein the first lock is further adapted to be engaged to selectively fix the second member and mount in place in a selected position relative to the first member and the self-propelled floor preparation machine;
      iii. a control stick mounted to and extending from the hub and adapted to be rotated about the first axis of rotation; and
      iv. an adjustable mounting bar coupling the first member of the joint to the self-propelled floor preparation machine, said adjustable mounting bar comprising two sections that are adapted to telescope with respect to each other to adjust the length of the adjustable mounting bar and a second lock adapted to secure the two sections together so that the adjustable mounting bar is fixed at a selected length; and
   c. a guard rail extending from the mount adjacent the control stick.

6. The self-propelled floor preparation machine of claim 5 wherein the adjustable mounting bar allows the height of the control stick to be adjusted, the joint allows at least the pitch of the control stick to be adjusted, and the hub allows yaw of the control stick to be adjusted.

7. The self-propelled floor preparation machine of claim 6 wherein the joint is selected from a group consisting of a ball joint and a double hinge joint.

8. The self-propelled floor preparation machine of claim 5 wherein the control stick is used to control the speed and direction of the self-propelled floor preparation machine.

9. The self-propelled floor preparation machine of claim 5 wherein operation of the first electric motor, and the speed and direction of the self-propelled floor preparation machine when the first electric motor is operating, are all controlled by manipulation of the control stick.

10. A controller for a self-propelled floor preparation machine comprising:
    a. a mount comprising a first handle and a hub defining a first axis of rotation, wherein the mount comprises a plate, and the first handle comprises a first opening through the plate;
    b. a joint having a first member coupled to the self-propelled floor preparation machine, a second member coupled to the mount, a pivot member adapted to permit the second member to pivot relative to the first member, and a first lock, wherein the first lock is adapted to be released to permit the second member and the mount to be pivoted relative to the first member and the self-propelled floor preparation machine, and wherein the first lock is further adapted to be engaged to selectively fix the second member and mount in place in a selected position relative to the first member and the self-propelled floor preparation machine; and c. a control stick mounted to and extending from the hub and adapted to be rotated about the first axis of rotation.

11. The controller of claim 10 wherein the mount comprises a second handle comprising a second opening through the plate.

12. A self-propelled shot blasting machine comprising:
a. a steerable drive wheel driven by a first electric motor;
b. a second electric motor driving a blasting wheel;
c. a hopper containing a supply of shot;
d. a valve for metering shot from the hopper to the blasting wheel;
e. a plenum coupled to a vacuum tube; and
f. a controller comprising:
  i. a mount comprising a first handle and a hub;
  ii. a joint having a first member coupled to the self-propelled shot blasting machine, a second member coupled to the mount, a pivot member adapted to permit the second member to pivot relative to the first member, and a first lock, wherein the first lock is adapted to be released to permit the second member and the mount to be pivoted relative to the first member and the self-propelled shot blasting machine, and wherein the first lock is further adapted to be engaged to selectively fix the second member and mount in place in a selected position relative to the first member and the self-propelled shot blasting machine;
  iii. a control stick mounted to and extending from the hub, wherein the control stick comprises buttons and is adapted to be manipulated to control the speed and direction of the self-propelled shot blasting machine.

13. The self-propelled shot blasting machine of claim 12 wherein said control stick is adapted to rotate relative to the mount about a first axis of rotation and said controller further comprises an adjustable mounting bar coupling the first member of the joint to the self-propelled shot blasting machine, said adjustable mounting bar comprising two sections that telescope with respect to each other to adjust the length of the adjustable mounting bar, and a second lock for securing the two sections together so the adjustable mounting bar is fixed at a selected length.

14. A controller for a self-propelled floor preparation machine comprising:
a. a mount comprising a first handle and a hub defining a first axis of rotation;
b. a joint having a first member coupled to the self-propelled floor preparation machine, a second member coupled to the mount, a pivot member adapted to permit the second member to pivot relative to the first member, and a first lock, wherein the first lock is adapted to be released to permit the second member and the mount to be pivoted relative to the first member and the self-propelled floor preparation machine, and wherein the first lock is further adapted to be engaged to selectively fix the second member and mount in place in a selected position relative to the first member and the self-propelled floor preparation machine;
c. a control stick mounted to and extending from the hub and adapted to be rotated about the first axis of rotation;
d. an adjustable mounting bar coupling the first member of the joint to the self-propelled floor preparation machine, said adjustable mounting bar comprising two sections that telescope with respect to each other to adjust the length of the adjustable mounting bar; and
e. a second lock for securing the two sections together so the adjustable mounting bar is fixed at a selected length.

15. A controller for a self-propelled floor preparation machine comprising:
a. a mount comprising a first handle and a hub defining a first axis of rotation;
b. a joint having a first member coupled to the self-propelled floor preparation machine, a second member coupled to the mount, a pivot member adapted to permit the second member to pivot relative to the first member, and a first lock, wherein the first lock is adapted to be released to permit the second member and the mount to be pivoted relative to the first member and the self-propelled floor preparation machine, and wherein the first lock is further adapted to be engaged to selectively fix the second member and mount in place in a selected position relative to the first member and the self-propelled floor preparation machine;
c. a control stick mounted to and extending from the hub and adapted to be rotated about the first axis of rotation, wherein the control stick comprises buttons and is adapted to control the speed and direction of travel of the self-propelled floor preparation machine.

16. A controller for a self-propelled floor preparation machine comprising:
a. a mount comprising a first handle and a hub defining a first axis of rotation;
b. a joint having a first member coupled to the self-propelled floor preparation machine, a second member coupled to the mount, a pivot member adapted to permit the second member to pivot relative to the first member, and a first lock, wherein the first lock is adapted to be released to permit the second member and the mount to be pivoted relative to the first member and the self-propelled floor preparation machine, and wherein the first lock is further adapted to be engaged to selectively fix the second member and mount in place in a selected position relative to the first member and the self-propelled floor preparation machine;
c. a control stick mounted to and extending from the hub and adapted to be rotated about the first axis of rotation; and
d. a guard rail extending from the mount adjacent the control stick.

17. A self-propelled floor preparation machine comprising:
a. a steerable drive wheel driven by a first electric motor; and
b. a controller comprising:
  i. a mount comprising a first handle and a hub defining a first axis of rotation;
  ii. a joint having a first member coupled to the self-propelled floor preparation machine, a second member coupled to the mount, a pivot member adapted to permit the second member to pivot relative to the first member, and a first lock, wherein the first lock is adapted to be released to permit the second member and the mount to be pivoted relative to the first member and the self-propelled floor preparation machine, wherein the first lock is further adapted to be engaged to selectively fix the second member and mount in place in a selected position relative to the first member and the self-propelled floor preparation machine, wherein the pivot member of the joint comprises a hinge pin having a threaded end, said pin extending along a second axis of rotation substantially perpendicular to the first axis of rotation and pivotally coupling said first member and second member together, wherein the first lock of the joint comprises a knob having a threaded bore adapted to receive the threaded end of the pin, wherein the first lock is adapted to be released by loosening the knob to permit the second member and the mount to be pivoted about the second axis of rotation and further adapted to be engaged by tightening the knob to selectively fix the second member and mount in place at a selected angle relative to the self-propelled floor preparation machine;

iii. a control stick mounted to and extending from the hub and adapted to be rotated about the first axis of rotation; and iv. an adjustable mounting bar coupling the first member of the joint to the self-propelled floor preparation machine, said adjustable mounting bar comprising two sections that are adapted to telescope with respect to each other to adjust the length of the adjustable mounting bar and a second lock adapted to secure the two sections together so that the adjustable mounting bar is fixed at a selected length.

18. A self-propelled floor preparation machine comprising:

a. a steerable drive wheel driven by a first electric motor; and b. a controller comprising:

i. a mount comprising a first handle and a hub defining a first axis of rotation;

ii. a joint having a first member coupled to the self-propelled floor preparation machine, a second member coupled to the mount, a pivot member adapted to permit the second member to pivot relative to the first member, and a first lock, wherein the first lock is adapted to be released to permit the second member and the mount to be pivoted relative to the first member and the self-propelled floor preparation machine, wherein the first lock is further adapted to be engaged to selectively fix the second member and mount in place in a selected position relative to the first member and the self-propelled floor preparation machine;

iii. a control stick mounted to and extending from the hub and adapted to be rotated about the first axis of rotation, wherein the control stick comprises a plurality of switches;

iv. an adjustable mounting bar coupling the first member of the joint to the self-propelled floor preparation machine, said adjustable mounting bar comprising two sections that are adapted to telescope with respect to each other to adjust the length of the adjustable mounting bar and a second lock adapted to secure the two sections together so that the adjustable mounting bar is fixed at a selected length.

* * * * *